United States Patent Office 3,823,182
Patented July 9, 1974

3,823,182
PROCESS FOR THE PREPARATION OF
THIAMPHENICOL GLYCINATE
Terumaro Nonaka, Konan, Yoshinobu Ishiguro, Hajima-gun, Isao Yamatsu, Ichinomiya, Chiaki Seki, Komaki, Shuzo Aoki, Ichinomiya, Yutaka Ohnuki, Konan, and Yoshihiro Koga, Takehaya-machi, Japan, assignors to Eisai Co., Ltd., Tokyo, Japan
No Drawing. Filed May 31, 1973, Ser. No. 365,724
Claims priority, application Japan, June 2, 1972, 47/54,352
Int. Cl. C07c 101/06
U.S. Cl. 260—482 R    2 Claims

ABSTRACT OF THE DISCLOSURE

An improvement in the process for the preparation of thiamphenicol glycinate in its pharmaceutically acceptable acid salts which are known as the therapeutically useful synthetic antibiotics, characterized in that thiamphenicol is first subjected to reaction with a lower-alkyl acetoacetate enaminoglycine, and the resulting product is then subjected to an acid hydrolysis. The purposed thiamphenicol glycinate is thus obtained in a good yield without difficulty in the procedure.

---

This invention is concerned with an improved process for the preparation of thiamphenicol glycinate in a form of its pharmaceutically acceptable salts having the formula:

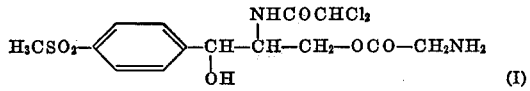

which is known as synthetic broad spectrum antibiotics.

Several methods for the synthesis of thiamphenicol glycinate were hitherto known, and among them the method disclosed in Japanese patent publication No. 27102 of 1968, for example, which involves the steps as schematically shown by the following chemical equations, is highly appreciated in a commercial viewpoint.

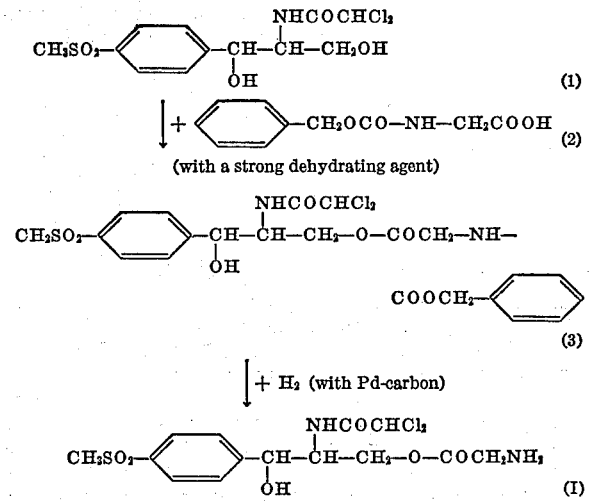

According to the above known method, thiamphenicol of the formula (1) is first subjected to reaction with N-carbobenzyloxyglycine of the formula (2) in the presence of a strong dehydrating agent such as dicyclohexyl carbodiimide and the like to obtain N-carbobenzyloxythiamphenicol glycinate of the formula (3). The latter in the second step is then subjected to decarbobenzyloxylation by the catalytic hydrogenation in the presence of palladium-carbon or the like to produce thiamphenicol glycinate of the formula (I) as the purposed final product.

It was, however, found that the above-mentioned known method possesses inevitable conveniences that (a) the first step for the production of N-carbobenzyl-oxythiamphenicol glycinate of the formula (3) wherein thiamphenicol is condensed with carbobenzyloxyglycine proceeds with a low yield leading to an overall poor yield such as 70% or less of the thiamphenicol glycinate as the final product; and (b) the second step for the decarboxybenzylation to produce the final compound (I) is needed to carry out the reaction which involves a dangerous catalytic hydrogenation in the presence of a considerably active catalyst.

It is an object of the present invention to provide an improved and novel method for the production of thiamphenicol glycinate of the formula (I). The method of the present invention offers the technical advantages over those hitherto employed, especially that of the Japanese patent publication above referred to, with respect to the overall yield of the intended product, and in addition, with no fear of any hazard accident that may occur in the course of hydrogenation in the presence of the active catalyst.

The method of this invention may be schematically represented as follows:

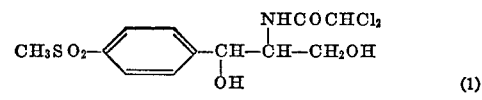

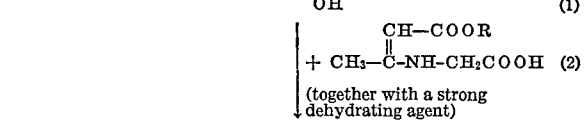

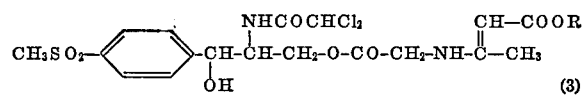

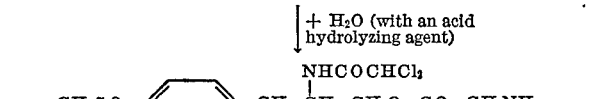

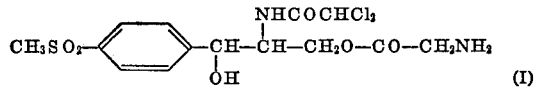

In the above formulae, R designates a lower alkyl.

In carrying out the novel process of the present invention in accordance with the above illustrated schematical diagrams, thiamphenicol of the formula (1) is first subjected to reaction with a lower-alkylacetoacetate enaminoglycine, i.e., a lower-alkylester of β-(N-hydroxycarbonyl-methylamino)crotonic acid, of the formula (2) in the presence of a strong dehydrating agent such as dicyclohexyl carbodiimide, aromatic sulfonic chloride and the like and, if necessary, in a single or mixed organic solvent such as dimethylformamide, dimethylacetamide, tetrahydrofuran, pyridine to produce the thiamphenicol lower-alkylacetoacetate enaminoglycinic ester of the above formula (3).

In the second step of the method of this invention, the thiamphenicol ester of the formula (3) is subjected to hydrolysis by treating it with an inorganic or organic acid hydrolyzing agent such as hydrochloric acid, sulfuric acid, methanolic hydrochloric acid, acetic acid and the like to result in the purposed thiamphenicol glycinate of the formula (I) with a good yield of 90% or more.

The lower-alkyl acetoacetate enaminoglycine as one of the reactants in the above-mentioned first step of this invention is preferably used in a form of its alkali metal salt.

The following example is illustrative of this invention.

EXAMPLE (a) Preparation of thiamphenicol ethylacetoacetate enaminoglycine ester 6 Grams of thiamphenicol were dissolved in a mixture consisting of 10 mls. of dimethylformamide and 6 mls. of pyridine. To the resulting solution were added 4.2 grams of sodium salt of ethylacetoacetate enaminoglycine. The resulting mixture was cooled to a temperature below 0° C., and there was added under stirring and cooling 2.3 grams of pyridine hydrochloride. After completion of the addition of pyridine hydrochloride, the stirring was continued under the same condition as the above for further 20 minutes. 4.2 Grams of dicyclohexyl carbodiimide were then added thereto. At a temperature below 0° C., the whole was further stirred for 2 hours and then for one hour at room temperature to complete the reaction.

Dicyclohexyl urea crystallized out was removed by filtration, and the filtrate was poured into 500 mls. of ice-water. After allowed to stand for 2 hours, the product crystallized out was recovered, washed with water and dried in air. There were obtained 8.26 grams of the product having the melting point of 99.5°–101.5° C., which was equivalent to 93.5% of the theoretical yield.

Elementary analysis of the product and the calculation for $C_{20}H_{26}Cl_2N_2O_8S$ gave:

|  | C | H | N | S | Cl |
|---|---|---|---|---|---|
| Calculated (percent) | 45.71 | 4.95 | 5.33 | 6.10 | 13.52 |
| Found (percent) | 45.56 | 4.89 | 5.45 | 6.20 | 13.68 |

(b) Preparation of thiamphenicol glycinate hydrochloride 8.0 Grams of thiamphenicol ethylacetoacetate enaminoglycine ester hydrochloride obtained in the last paragraph of the above Item (a) were dissolved in 40 mls. of methanol. To the solution were added 20 grams of a 35% hydrochloric acid, refluxed for a while and chilled. The hydrochloride of thiamphenicol glycinate crystallized out which was recovered by filtration. There were obtained 6.50 grams of the hydrochloride of the purposed product having the melting point of 188°–190° C. Yield amounted to 95.4% of the theory.

Mixed examination of the product with a sample of a thiamphenicol glycinate hydrochloride separately prepared in accordance with the known method disclosed in the afore-mentioned Japanese patent publication did not show any depression of the melting point.

What is claimed is:

1. A process for the preparation of thamphenicol glycinate represented by the formula:

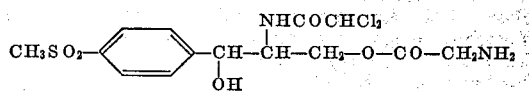

which comprises reacting an acid hydrolyzing agent with thiamphenicol lower-alkyl acetoacetate enaminoglycine ester derived from thiamphenicol and represented by the formula:

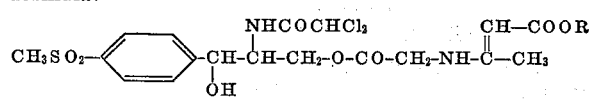

wherein R designates a lower-alkyl group.

2. A process as claimed in claim 1 wherein thiamphenicol lower-alkyl acetoacetate enaminoglycine ester is employed which was prepared by the reaction of thiamphenicol and a lower-alkyl ester of β-(N-hydroxycarbonyl-methylamino)-crotonic acid in the presence of a strong dehydrating agent.

References Cited

UNITED STATES PATENTS 3,100,782    8/1963    Concilio et al. _____ 260—343.7

FOREIGN PATENTS 866,788    5/1961    Great Britain _____ 260—482
890,313    2/1962    Great Britain _____ 260—482

LORRAINE A. WEINBERGER, Primary Examiner

P. J. KILLOS, Assistant Examiner

U.S. Cl. X.R.

260—482 P, 553 R